United States Patent [19]

Allen, deceased et al.

[11] 4,345,440
[45] Aug. 24, 1982

[54] REFRIGERATION APPARATUS AND METHOD

[76] Inventors: Reed R. Allen, deceased, late of Sunnyvale, Calif.; by Mary G. Allen, heir, 825 S. Wolfe Rd., Sunnyvale, Calif. 94086

[21] Appl. No.: 230,248

[22] Filed: Feb. 2, 1981

[51] Int. Cl.³ ............................................... F25B 1/00
[52] U.S. Cl. .................................... 62/116; 62/238.4; 62/500
[58] Field of Search ................ 62/116, 238.3, 238.4, 62/500

[56] References Cited

U.S. PATENT DOCUMENTS

| | | | |
|---|---|---|---|
| 1,972,705 | 9/1934 | Crosthwait, Jr. | 62/116 |
| 2,044,811 | 6/1936 | Randel | 62/116 |
| 2,088,609 | 8/1937 | Randel | 62/116 |
| 2,852,922 | 9/1958 | Neumann et al. | 62/500 |
| 3,277,660 | 10/1966 | Kemper et al. | 62/116 |
| 3,500,897 | 3/1970 | Von Cube | 62/500 |
| 3,922,877 | 12/1975 | Ophir et al. | 62/238.4 |
| 4,164,850 | 8/1979 | Lowi, Jr. | 62/238.4 |

*Primary Examiner*—Lloyd L. King
*Attorney, Agent, or Firm*—Kenneth R. Allen

[57] ABSTRACT

A refrigeration system employing an adiabatic expansion and an impulse generating means for the oscillatory compression and pumping of the working fluid. The impulse generating means is a venturi having a liquid inlet downstream of the throat with means for applying heat by a heat source, typically the waste heat of an automobile engine to the working fluid. The working fluid may be used to cool air through an evaporation in an automobile passenger compartment.

11 Claims, 3 Drawing Figures

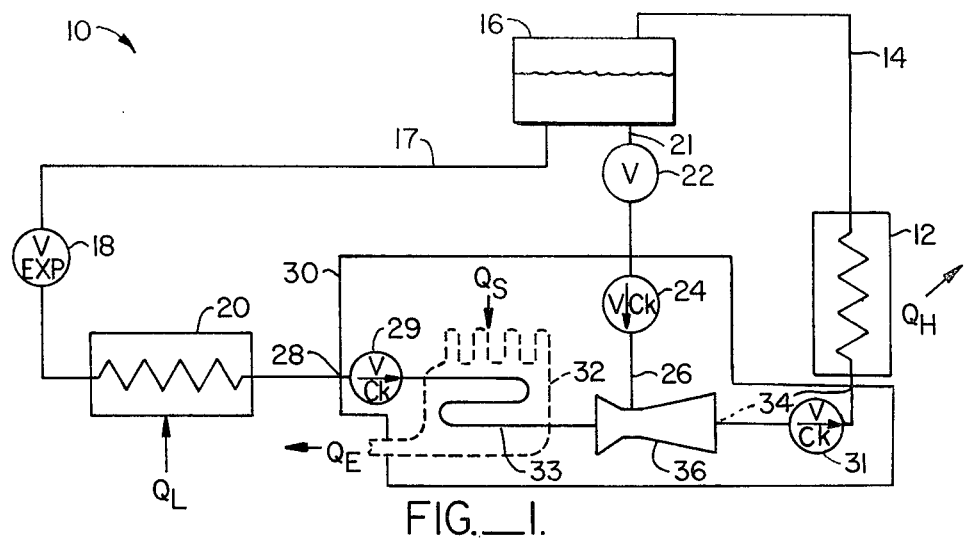
FIG._1.
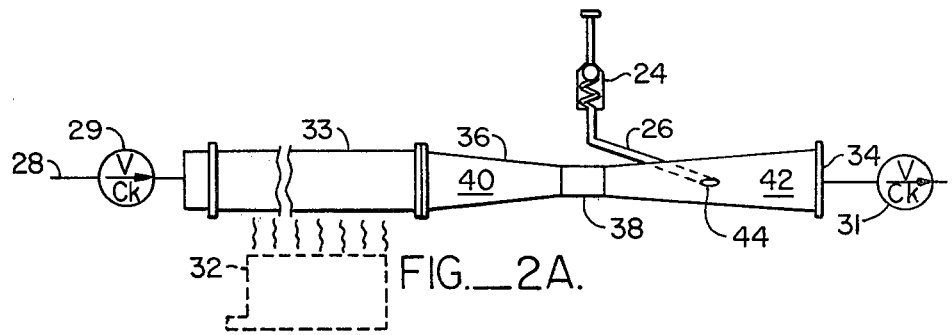
FIG._2A.
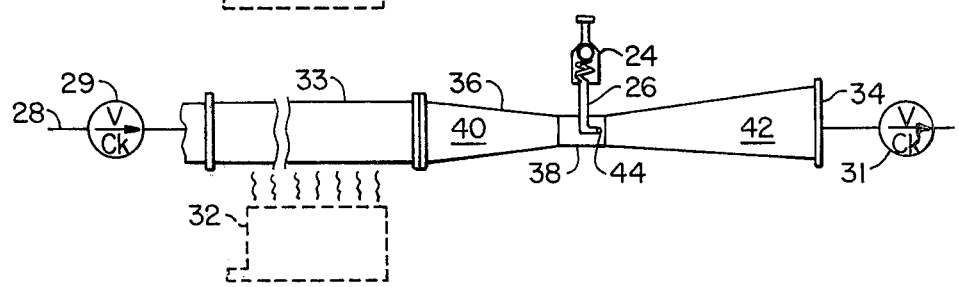
FIG._2B.

REFRIGERATION APPARATUS AND METHOD

BACKGROUND OF THE INVENTION

1. Field of Invention

This invention relates to adiabatic expansion refrigeration systems and in particular to air conditioning systems having a readily accessible source of low-grade heat, such as in an automobile.

Typical air conditioning refrigeration systems for automotive applications employ mechanical compressors to convert low-pressure vapor to high-pressure vapor in a closed refrigeration circuit and which employ adiabatic expansion and condensation to extract heat from the environment of the passenger compartment. The mechanical refrigeration circuit comprises a mechanical compressor, a vapor condenser and an evaporator or a refrigeration unit in a heat exchanger. In systems such as an automobile air conditioning system considerable power is expended in order to drive the compressor. The power is derived from the mechanical output of the internal combustion engine which increases the fuel consumption and may cause the engine to overheat. What is needed is an air conditioning system which does not waste fuel or cause excessive heating.

2. Description of the Prior Art

Absorption-type refrigeration systems are known which employ a heat source and highly endothermic reactants such as halide salts in water as heat absorption media. Such refrigeration systems operate on a principle of heat absorption by heat exchange with the environment upon contact with endothermic reaction products. The reactants involved in the endothermic reaction are typically separated by heating for recycling. Any substances having high endothermic affinity for one another and which can be separated by heating may in theory be used in an absorption refrigeration system.

Also well-known are ammonia-absorption refrigeration cycle systems in which ammonia vapor is absorbed and extracted from ammonia solution. Ammonia-absorption systems are justified only in cases where a suitable source of heat is available which would otherwise be wasted. Ammonia is also known for use in adiabatic expansion refrigeration systems. All of these systems have been suggested for automotive applications.

The following patents were uncovered in a review of prior art refrigeration systems:

Tsunesuke Kubo et al., U.S. Pat. No. 3,077,083 issued Feb. 12, 1963;

Pippert, U.S. Pat. No. 3,153,441 issued Oct. 20, 1964;

Hess, Jr., U.S. Pat. No. 3,230,731 issued Jan. 25, 1966; and

Eannarino et al., U.S. Pat. No. 3,535,888 issued Oct. 27, 1970.

The known prior art suggests the use of absorption-type air conditioning systems in connection with automotive applications where there is a source of heat available which might otherwise be wasted. While the prior art suggests elimination of mechanical compressors, nothing is suggested which would be a suitable substitute for a mechanical compressor in an adiabatic expansion refrigeration system.

SUMMARY OF THE INVENTION

According to the present invention, a thermodynamic compressor is provided in an adiabatic expansion refrigeration system. The method of the invention includes heat-driven impulse compression of a working fluid in a closed adiabatic expansion refrigeration circuit. The impulse compression is provided by a venturi having no moving parts comprising a venturi throat into which heated vapors of the working fluid are introduced and an inlet port adjacent the low-pressure region of the venturi throat through which liquid working fluid is introduced. The venturi mechanism is operative in response to heat input to generate pressure oscillations or impulses which are sufficient to compress the refrigeration fluid in pressure oscillations or impulses. The invention has particular application in an automotive air conditioning system where a source of waste heat is available and where fuel consumption is a consideration.

The invention has the advantage of eliminating a need for a mechanically driven compressor.

The invention will be best understood by reference to the following detailed description taken in connection with the accompanying drawings.

BRIEF DESCRIPTION OF THE DRAWINGS

FIG. 1 is a schematic diagram of a refrigeration system according to the invention.

FIG. 2A is a schematic diagram of a first specific impulse generator according to the invention.

FIG. 2B is a schematic diagram of a second specific impulse generator according to the invention.

DETAILED DESCRIPTION OF SPECIFIC EMBODIMENTS

Referring to FIG. 1 there is shown one embodiment of a refrigeration apparatus 10 according to the invention. The apparatus 10 includes a condenser 12 in which heat in a refrigeration fluid is extracted and the fluid condensed to a liquid. The outlet is a supply line or condenser return 14 to an accumulator reservoir 16. The accumulator reservoir 16 is a sealed reservoir which maintains liquid and vapor in substantial thermal equilibrium thus resisting substantial pressure excursions. The reservoir 16 has two liquid fluid outlets 17 and 21 which draw from that portion of the reservoir 16 normally occupied by the refrigeration fluid in a liquid state.

A first liquid feed line 17 from the reservoir 16 is coupled to an expansion means, which is preferably a capillary expansion valve 18. The capillary expansion valve 18 is operative to expand the liquid refrigerant received through feed line 17 adiabatically. The outlet of the capillary expansion valve 18 is coupled to an evaporator 20, normally enclosed in the space to be cooled. The evaporator 20 is operative to draw heat from the surrounding environment on evaporation of adiabatically expanded liquid introduced at its inlet.

The second liquid outlet of the reservoir 16 is a liquid feed line 21 coupled through a metering valve 22 to an impulse generator unit 30. The outlet is coupled to a liquid inlet 26 of a venturi 36, having a gas input, a throat and a gas output, as hereinafter explained.

Returning to the evaporator 20, vapor from the evaporator 20 is introduced through a vapor feed line 28 to the impulse generator unit 30. A heat input means 32 is provided in the impulse generator unit 30 through a heat exchanger 33, which may be in the vapor inlet path. The heat input means 32 may be any source of heat, but it is preferably the exhaust manifold of an internal combustion engine.

The source of heat $Q_S$ is heat in the waste combustion products of internal combustion engine. Any heat not transferred through the heat exchanger 33 is expelled from the heat input means as waste heat $Q_E$.

The heat exchanger 33 is coupled to the gas inlet of the venturi 36 in the impulse generator unit 30. The venturi gas outlet is coupled through a return 34 for vapor which is in turn coupled to the inlet of the condenser 12, thus forming a thermodynamic system with closed fluid system, heat input and exhaust and a thermodynamically driven pump.

In the impulse generator unit 30 there are shown three check valves 24, 29 and 31. These check valves are respectively in the liquid feed line 21, the vapor feed line 28 and the vapor exhaust line 34. These check valves 24, 29 and 31 are operative to assure that flow of fluid is unidirectional into the condenser 12, in the indicated direction. Check valves physically distinct from the venturi 36 may not be necessarily due to inherent characteristics of the venturi 36 in operation. However, such check valves may be employed as a measure of redundancy.

Turning to FIG. 2A and FIG. 2B, there are shown two embodiments of the impulse generator unit 30. In each embodiment of the impulse generator unit 30 the venturi 36 is a tube which comprises a constrictive throat section 38 having a converging section 40 for vapor inlet of one side and a diverging section 42 for vapor outlet on the side of the throat section 38 opposing the convergent section. The inlet to the converging section 40 is coupled from a chamber comprising the heat exchanger 33 which is in thermal communication with the heat input means 32. The outlet of the diverging section 42 is coupled to the vapor return 34 which in turn is coupled to the inlet of the condenser 12 (FIG. 1).

The one-way check valve 24 in the liquid feed line 21 may be a simple spring biased ball check valve. The liquid inlet 26 to the impulse generator is disposed, in one embodiment (FIG. 2A), in the diverging section 42 of the venturi 36 defining a port 44 for introducing liquid in a downstream direction into the vapor path.

In another embodiment (FIG. 2B), the liquid inlet 26 to the venturi 36 is disposed at the constrictive throat section 38 as a tube to define an inlet port 44 in the throat 38 of the venturi 36. The nozzle of the port 44 is disposed to direct fluid in a downstream direction toward the diverging section 42.

Since the operation of the invention is not immediately obvious, the following explanation is offered. Vapor and liquid are introduced into the impulse generator 30 through the vapor feed line 28 and liquid inlet 26. Heat is introduced into the impulse generator 30 through a heat source 32. The liquid from the liquid inlet 26 (which itself may be heated above the temperature of vaporization) drips or trickles into the region containing heated fluid. Upon encountering the heated vapor and relatively low pressure in the venturi 36, the liquid expands rapidly and it vaporizes. A pressure impulse is thereby created in the venturi 36. The impulse pressure is such as to cause the vapor to be drawn from the vapor inlet 28 and to propel the fluids introduced through both port 44 and the throat 38 from the vapor inlet 28 along the diverging section 42 toward the vapor return 34. The impulse generator unit 30 is operative to both compress vapors introduced at the vapor inlet 28 and to propel it, together with the added liquid, now vaporized, through the vapor return 34. Accordingly, the pressure-volume relationship of the vapor line and the related travel time of impulses along the vapor path, particularly between the venturi throat 38 and the region of condensation within the condenser 12 (where the fluid becomes essentially incompressible), should have an effect on the oscillation frequency of the impulse generator unit 30.

The entire refrigeration apparatus 10 is a closed fluid system in that there are no external inlets or outlets for vapor or liquid to the refrigerant paths. The accumulator reservoir 16 is operative both as a liquid storage reservoir and as a pressure ballast relative to the pressure oscillation of the impulse generator unit 30.

A number of alternative embodiments are within the contemplation of the invention. For example, the heat of the heat input means 32 may be applied directly to the venturi 36. Similarly, heat can be applied to the liquid in the liquid inlet line 26 rather than to the vapor feed line coupled to the vapor inlet of the venturi 36. Alternatively, heat may be applied at both sites. A second venturi might also be used downstream of the liquid inlet in order to further pressurize high velocity fluid in the return path to the condenser 12.

A variety of refrigerants can be employed in a cooling system according to the invention. For example, lithium bromide, lithium chloride and Freon may be used with the internal pressure of the system being selected to assure that there a vapor-liquid transition through the evaporator and the condenser. In addition, the efficiency can be enhanced by adding convective heat transfer mechanisms such as fans to the condenser and to the evaporator. Except for such items as fans and possibly optional check valves, there are no moving parts in the system.

The invention has now been explained with reference to specific embodiments. Other embodiments will be apparent to those of ordinary skill in the art. For example, while the invention has been described in terms of impulse pump, under some conditions, a system according to the invention may operate with a steady state stream through the venturi and still provide refrigeration. It is therefore not intended that this invention be limited except as indicated by the appended claims.

What is claimed is:

1. An apparatus for adiabatic cooling of a refrigeration fluid in a closed fluid system for use in connection with a heat source for cooling applications, said apparatus comprising:
   means coupled to receive refrigeration fluid as a vapor from a fluid return for condensing said refrigeration fluid to a liquid in order to expel heat from said refrigeration fluid;
   reservoir means coupled to receive said refrigeration fluid from said condensing means for accumulating said refrigeration fluid in a liquid phase and vapor phase mixture;
   means coupled to receive liquid phase refrigeration fluid from said accumulating means for depressurizing said liquid phase refrigeration fluid adiabatically;
   means coupled to said adiabatically depressurizing means for evaporating said refrigeration fluid and thereby to draw heat from an external environment to be cooled; and
   means devoid of external mechanical input coupled to receive evaporated refrigeration fluid from said evaporating means and liquid refrigeration fluid from said accumulating means for mixing said refrigeration fluid and for propelling said refrigeration fluid to said condensing means under pressure greater than the pressure at the outlet of said evaporating means in response to heat applied to said refrigeration fluid by said heat source, said propelling means including a liquid refrigeration fluid inlet, a vapor refrigeration fluid inlet, a venturi having a convergent section coupled to said vapor refrigeration inlet, a constrictive throat and a divergent section, said divergent section being said fluid return to said condensing means.

2. The apparatus according to claim 1 wherein said propelling means further comprises:
heat exchanger means coupled to said venturi for heating said vapor refrigeration fluid and said liquid refrigeration fluid in said venturi; and
one-way check valve means for constraining fluid to flow to said condensing means.

3. The apparatus according to claim 1 wherein said propelling means further comprises:
a liquid inlet port for introducing said liquid refrigeration fluid into said divergent section,
said propelling means being operative to urge said refrigeration fluid as a vapor toward said vapor return in pulse-like oscillation in response to heat applied to said propelling means.

4. The apparatus as claimed in claim 1 wherein said propelling means further comprises:
a heat exchanger means coupled to said vapor refrigeration fluid inlet for transferring heat from said heat source to said vapor refrigeration fluid; and
a liquid inlet port for introducing said liquid refrigeration fluid into said divergent section of said venturi wherein said propelling means is operative to urge said refrigeration fluid as a vapor through said fluid return in pulse-like oscillation in response to heat input through said heat exchanger means.

5. The apparatus according to claim 4 wherein said inlet port is disposed adjacent said venturi throat and directed in a generally downstream direction.

6. The apparatus according to claim 4 further including one-way check valve means in said liquid inlet between said reservoir means and said propelling means for constraining liquid to flow into said propelling means.

7. The apparatus according to claim 4 further including means between said liquid inlet port and said condensing means for thermodynamically compressing said vapor refrigeration fluid, said thermal compressing means comprising a second venturi downstream of said propelling means.

8. The apparatus according to claim 1 wherein said propelling means further comprises:
heat exchanger means coupled to said vapor refrigeration fluid inlet and to said liquid refrigeration fluid inlet for transferring heat from said heat source to said vapor refrigeration fluid and to said liquid refrigeration fluid;
one-way check valve means in said liquid inlet between said heat exchanger means and said accumulating means for constraining liquid to flow into said propelling means;
a liquid inlet port for introducing said liquid refrigeration fluid into said divergent section; and
a second venturi between said liquid inlet port and said condensing means for thermodynamically compressing refrigeration fluid which is urged through said second venturi.

9. The apparatus as claimed in claim 1 wherein said propelling means further comprises:
a heat exchanger means disposed in thermal contact with a combustion exhaust system of an internal combustion engine and coupled to said liquid refrigeration fluid inlet for transferring heat from said heat source to said vapor refrigeration fluid; and
means in said venturi defining a liquid inlet port disposed downstream of said constrictive throat facing in a downstream direction for introducing said liquid refrigeration fluid downstream of said convergent section, said venturi being operative as a oscillatory compressor as fluid is flowed therethrough.

10. A method for refrigeration comprising:
condensing in a condenser means compressed vaporized refrigeration fluid to a liquid phase to expel heat to a heat sink;
accumulating said condensed liquid phase fluid in a sealed reservoir at substantial equilibrium with said fluid in vapor phase;
adiabatically depressurizing a first portion of said liquid phase fluid from said reservoir;
evaporating in a heat exchanging means said first portion as adiabatically depressurized liquid phase to a vapor phase fluid to draw heat from an environment to be cooled;
introducing said first portion as vapor phase fluid at an inlet of a converging section of a venturi having a converging section, a constrictive throat and a diverging section;
introducing a second portion of liquid phase fluid from said reservoir into said venturi downstream of said throat;
applying sufficient heat to said first portion of said fluid introduced into said venturi to cause said first portion and said second portion upon mixture to be propelled as a compressed vapor phase fluid through said venturi; and
returning said compressed vapor phase fluid from said venturi to said condensing means for condensing;
said method being devoid of external mechanical input to propel said refrigeration fluid in any physical phase.

11. The method as claimed in claim 10 wherein said heat applying step includes applying said heat in a sufficient amount at pressures and temperatures internal to said venturi to cause said fluids to be propelled as vapors in pulses through said venturi upon mixing in said venturi.

* * * * *